(12) United States Patent
Roskind et al.

(10) Patent No.: US 9,565,258 B1
(45) Date of Patent: Feb. 7, 2017

(54) LOWER LATENCY CONNECTIONS USING SPECULATIVE DNS RESOLUTION

(71) Applicant: Google Inc., Mountain View, CA (US)

(72) Inventors: James Anthony Roskind, Redwood City, CA (US); Ryan Hamilton, San Jose, CA (US)

(73) Assignee: Google Inc., Mountain View, CA (US)

( * ) Notice: Subject to any disclaimer, the term of this patent is extended or adjusted under 35 U.S.C. 154(b) by 249 days.

(21) Appl. No.: 14/070,417

(22) Filed: Nov. 1, 2013

(51) Int. Cl.
*G06F 15/16* (2006.01)
*G06F 3/00* (2006.01)
*H04L 29/08* (2006.01)

(52) U.S. Cl.
CPC .................... *H04L 67/14* (2013.01)

(58) Field of Classification Search
CPC ........... H04L 29/08072; H04L 29/0809; H04L 29/06; H04L 41/22; H04L 41/12; H04L 12/2602; H04L 43/00; H04L 43/045; G06F 17/3089; G06Q 10/10
USPC .......................................................... 709/218
See application file for complete search history.

(56) References Cited

U.S. PATENT DOCUMENTS

| 2008/0229021 A1* | 9/2008 | Plamondon | H04L 67/2847 711/125 |
| 2008/0229025 A1* | 9/2008 | Plamondon | G06F 12/0862 711/126 |
| 2008/0275748 A1* | 11/2008 | John | G06Q 30/06 705/35 |
| 2012/0260181 A1* | 10/2012 | Sule | G06F 9/4843 715/736 |

* cited by examiner

*Primary Examiner* — Emmanuel L Moise
*Assistant Examiner* — Mahran Abu Roumi
(74) *Attorney, Agent, or Firm* — McDermott Will & Emery LLP

(57) ABSTRACT

Methods for lower latency connections using speculative DNS resolution are provided. In one aspect, a method includes receiving a request at a client for a web resource to be sent to a hostname. The method also includes obtaining a speculative Domain Name System (DNS) resolution of the hostname from a source local to the client. The method also includes initiating a connection to the hostname using the obtained speculative DNS resolution of the hostname. Systems and machine-readable media are also provided.

9 Claims, 5 Drawing Sheets

LOWER LATENCY CONNECTIONS USING SPECULATIVE DNS RESOLUTION

BACKGROUND

Field

The present disclosure generally relates to the transmission of data over a network, and more particularly to the connection of a computing device with another computing device.

Description of the Related Art

In order for a client to receive content from a hostname, a connection must be established. Establishing a connection on the internet typically requires two steps: resolving a hostname to an IP address, and then contacting the hostname at the IP address to establish the connection. In order to resolve a hostname to an IP address, the client asks a Domain Name System (DNS) resolver for the IP address for a given hostname. Once the client has obtained the IP address, the client is then able to contact the hostname at the IP address to establish the connection.

SUMMARY

According to one embodiment of the present disclosure, a computer-implemented method for speculative DNS resolution is provided. The method includes receiving a request at a client for a web resource to be sent to a hostname. The method also includes obtaining a speculative DNS resolution of the hostname from a source local to the client. The method also includes initiating a connection to the hostname using the obtained speculative DNS resolution of the hostname.

According to one embodiment of the present disclosure, a system for speculative DNS resolution is provided. The system includes a memory storing executable instructions and a processor configured to execute the executable instructions stored in the memory to receive a request at a client for a web resource to be sent to a hostname. The processor is also configured to obtain a speculative DNS resolution of the hostname from a source local to the client, wherein the source comprises a local speculative DNS resolution cache. The processor is also configured to initiate a connection to the hostname using the obtained speculative DNS resolution of the hostname.

According to one embodiment of the present disclosure, a non-transitory machine-readable medium embodying instructions is provided. These instructions, when executed by a machine, allow the machine to perform a method. The method includes receiving a command to connect to a hostname. The method also includes obtaining a speculative resolution of the hostname from a local source. The method also includes initiating a connection to the hostname using the obtained speculative resolution of the hostname. The method also includes requesting an authoritative DNS resolution of the hostname from an authoritative resolver concurrently with initiating the connection to the hostname using the speculative DNS resolution. The method also includes receiving the authoritative DNS resolution of the hostname. The method also includes verifying the speculative DNS resolution with the authoritative DNS resolution.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
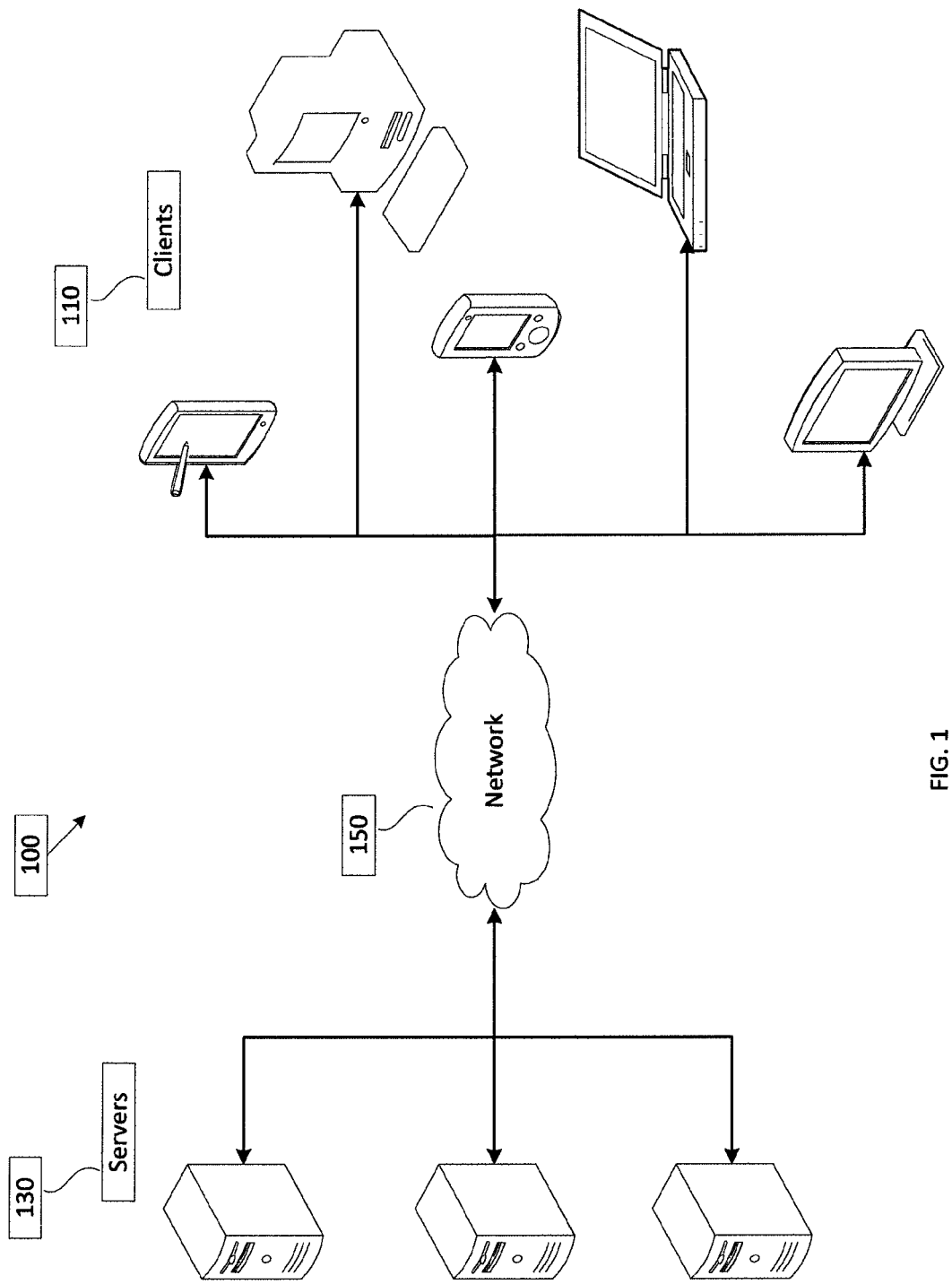
FIG. 1 illustrates an example architecture for speculative DNS resolution.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed application provides lower latency in connecting to a hostname. The subject technology receives a request at a client for a web resource to be sent to a hostname. It then obtains a speculative DNS resolution of the hostname from a source local to the client. Finally, it initiates connection to the hostname using the obtained speculative DNS resolution of the hostname.

As used herein, a "speculative" DNS resolution encompasses its plain and ordinary meaning including, but not limited to, a DNS resolution whose validity may be speculative in nature.

One way of obtaining speculative resolution prior to establishing a request for connection is to use a previous DNS resolution stored in a local speculative DNS resolution cache, which contains non-authoritative DNS resolutions. Though the resolution's TTL (Time To Live) may have expired, it may still be used as a speculative resolution for the hostname, and may still be a valid location to connect to the hostname. The client may initiate connection using a speculative resolution of the hostname and the client may also contemporaneously initiate a DNS resolution request. Once the client has received the contemporaneous DNS resolution of the hostname, it may verify the speculative resolution with the contemporaneous DNS resolution. If the client is able to connect to the hostname using the speculative resolution, then the client may abandon the traditional DNS resolution request. The client may delay further transmission to the hostname associated with the speculative resolution until the speculative resolution can be verified by the contemporaneous DNS resolution. If the client is unable to verify the speculative resolution of the hostname with the contemporaneous DNS resolution, then the client may abandon connection with the hostname associated with the speculative resolution of the hostname. If the client is unable to connect to the hostname using the speculative resolution, then the client may proceed with the traditional DNS resolution request.

Another way of obtaining speculative resolution prior to establishing a request for connection is for the host to provide speculative resolutions of a second hostname to the client. A host may provide resolutions for additional hostnames that it expects will be useful for a client. The client may obtain these speculative resolutions by parsing the speculative resolution from a received resource, such as a web document. A host may, for example, communicate these speculative resolutions as a prefix to an unadorned domain name, or as an additional attribute in an HTML link, or as an additional argument to an XHR request.

This approach is distinct from a DNS pre-resolution. In a DNS pre-resolution, an application may receive one or more hostnames that the client may connect to next, and the client requests DNS resolutions from a DNS resolver of all of the one or more potential hostnames the client may attempt to connect to. That is, a DNS pre-resolution performs resolution requests from the DNS resolver before the client requests them. By contrast, the subject technology minimizes resolutions from the DNS resolver by using speculative DNS resolutions.

DNS pre-resolution may only be applicable when there is enough warning of the impending need for a resolution. Even with the pre-resolution, there is a chance that the resolution will "expire" (e.g., exceed its Time To Live (TTL)) before the point in time at which the resolution is used.

FIG. 1 illustrates an example architecture 100 for speculative DNS resolution. The architecture 100 includes servers 130 and clients 110 connected over a network 150.

Each of the many clients 110 is configured to include and execute an application for providing content. The application can be, for example, a web browser, a video playing program, a document or text editing program, an image editing program, a video editing program, a gaming program, or any other program. The content can be, for example, a web page, a document, an image, a video, an audio file, a game, or other content. In order for the client 110 to provide the content, the client 110 may have to access a server 130 for a web resource. A web resource may also be, for example, a web page, a document, an image, a video, an audio file, a game, or other content.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities for providing content. In some embodiments, a client 110 may be a proxy server or other intermediary, that makes connections and fetches resources on behalf of some other client.

The servers 130 can be any device having an appropriate processor, memory, and communications capability for hosting the content. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
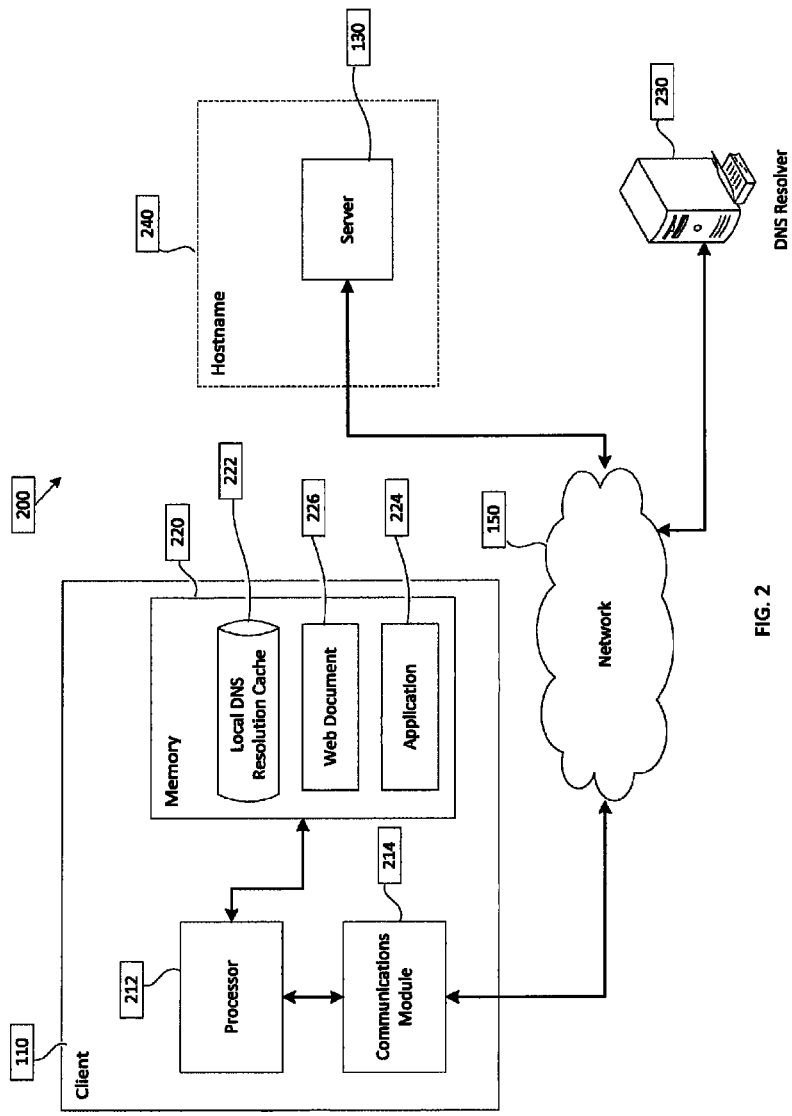
FIG. 2 is a block diagram illustrating an example client and server from the architecture of FIG. 1 according to certain aspects of the disclosure.

FIG. 2 is a block diagram 200 illustrating an example client 110 and server 130 in the architecture 100 of FIG. 1 according to certain aspects of the disclosure. The client 110 and the server 130 are connected over the network 150.

The client 110 includes a processor 212, a communications module 214, and memory 220 that includes an application 224, a local speculative DNS resolution cache 222, and a web document 226. The application 224 can be a web browser, a document or text editing program, an image editing program, a video editing program, a gaming program, or any other program. By way of non-limiting example, the content as discussed herein will be a web page, although other content can be used with the disclosed system, such as a document, an image, a video, an audio file, a game, or other content. The local speculative DNS resolution cache 222 stores hostnames 240 and DNS resolutions the client 110 previously used to connect to the hostname 240. In some embodiments a local DNS resolution cache stores both authoritative and speculative DNS resolutions.

The web document 226 can be obtained from the hostname 240, or another hostname or another client or created by the client 110. The web document may contain content, pictures, words, video, audio, and the underlying computer code therein. The computer code underlying the web document 226 may contain speculative DNS resolutions to one or more hostnames and may include speculative DNS resolution to hostname 240. The speculative DNS resolutions provided to the client 110 may be for hostnames that the speculative DNS resolution provider expects will be useful to the client 110. The hostname may be useful to a client 110 if there is a likelihood of future navigation to the hostname.

In certain aspects, the speculative DNS resolution may be provided within the HTTP content, such as within an HTML page, or may be provided as a prefix to an unadorned hostname. For example, if the hostname "example.com" has a DNS resolution to the IP address of "1.2.3.4," then the web document 226 may contain "1.2.3.4.example.com" to provide the client 110 a hostname 240 and its accompanying speculative DNS resolution. The speculative DNS resolution in a web document 226 may be listed as an additional argument on an HTML link or as an additional argument to an XHR request. The speculative DNS resolution in a web document 226 may also be included in HTML markup, such as entry in the <HEAD> or other section, such as the HTTP header. For example, an entry in the <HEAD> may be <resolution href="example.com" ip="1.2.3.4">. In another example, an entry in the HTTP header may be X-DNS-Push: example.com/1.2.3.4.

The communications module 214 is configured to interface with the network 150 to send and receive information, such as data, requests, responses, and commands to other devices on the network. The communications module 214 can be, for example, modems or Ethernet cards.

The DNS resolver 230 provides mappings of hostnames to IP address sets. The client 110 requests DNS resolution of a hostname to the DNS resolver 230 and the DNS resolver 230 provides one or more IP addresses mapped to that hostname. For example, the hostname "example.com" may be mapped to the IP addresses "1.2.3.4" and "1.2.3.5." The hostname "example.net" may be mapped to the IP address "6.7.8.9." Once the DNS resolver 230 provides the client 110 the one or more IP addresses, the client 110 can use the one or more IP addresses to connect to the hostname 240.

The hostname 240 is the destination the client 110 connects to for a web resource. The web resource of the hostname 240 is stored on the server 130.

For example, the processor 212 of the client 110 executes instructions from the application 224 to send a resource request to a hostname 240 "example.com." The client 110 obtains the IP address of the hostname 240 from the DNS resolver 230. The DNS server 230 may provide "1.2.3.4" as the IP address for "example.com." The client 110 then attempts to establish a connection to the hostname 240 "example.com" by going to the IP address "1.2.3.4." Once the client 110 has made a connection with the hostname 240 "example.com," the client 110 may send the web resource request, such as a request for video data, to the server 130 of the hostname 240 "example.com." After the connection to the hostname 240 has been established, the client 110 may save the hostname 240 "example.com" and the DNS resolution of the hostname 240 "1.2.3.4," in the local speculative DNS resolution cache 222.

In certain aspects, when a client 110 receives a request for a web resource to be sent to a hostname 240, the client will obtain a speculative DNS resolution of the hostname 240 from a source local to the client. In certain aspects, the source is a local speculative DNS resolution cache 222 and the client 110 may obtain the speculative DNS resolution by looking up the speculative DNS resolution of the hostname 240 in the local speculative DNS resolution cache 222, based on the hostname 240. The client 110 may use this speculative DNS resolution to connect to the hostname without waiting for DNS resolution from the DNS resolver 230.

For example, if the client 110 again receives a request for a web resource to be sent to the hostname 240 "example.com," then the client 110 may access the local speculative DNS resolution cache 222. The local speculative DNS resolution cache 222 may contain an entry associating "1.2.3.4" with "example.com" and the client 110 could use "1.2.3.4" as a speculative DNS resolution and initiate a connection to "example.com."

In certain aspects, the source local to the client 110 is a web document 226 and the client may obtain the speculative DNS resolution by parsing the web document 226. For example, the web document 226 may contain an HTML link with an additional attribute. For example, the web document 226 may contain, within the underlying HTML code, "<a href="example.com" ip="1.2.3.4">." The client 110 may then parse the web document 226 and identify that the speculative DNS resolution of "example.com" is "1.2.3.4."

In certain aspects, in addition to initiating a connection to the hostname 240 using the obtained speculative DNS resolution, the client 110 may concurrently request an authoritative DNS resolution of the hostname 240 from the DNS resolver 230. As used herein, an "authoritative" DNS resolution encompasses its plain and ordinary meaning including, but not limited to, the DNS resolution of the hostname 240, and sufficiently contemporaneously to be trusted. For example, sufficiently contemporaneously may mean within the TTL validity period supplied with the DNS resolution. The client 110 may then receive the authoritative DNS resolution from the DNS resolver 230 and verify the speculative DNS resolution with the authoritative DNS resolution. In certain aspects, the client 110 may send the resource request to the hostname 240 using the speculative DNS resolution after the speculative DNS resolution has been verified with the authoritative DNS resolution.

For example, with a TCP connection, a client 110 may send a TCP SYN message to the hostname 240 to initiate connection with a speculative DNS resolution, while the client 110 may also request a hostname resolution from the DNS resolver 230. The hostname 240 may respond with a TCP-SYN-ACK. An authoritative DNS resolution request response from the DNS resolver 230 may include a list of IP addresses or an explicit assertion that the DNS resolution was not found.

In yet another example, in QUIC, a speculative DNS resolution may be used to send a QUIC client hello (CHLO) packet, while the client 110 may also request a hostname resolution from the DNS resolver 230. The hostname 240 may respond with a server hello (SHLO) or a reject (REJ). The DNS resolver 230 may respond to the authoritative DNS resolution request with a list of IP addresses or an explicit assertion that the DNS resolution was not found.

In certain aspects, when a client 110 initiates connection to a hostname 240 using a speculative DNS resolution and concurrently requests an authoritative DNS resolution from a DNS resolver 230, additional transmission using the speculative DNS resolution may be delayed until a response from the DNS resolver 230 is received.

For example, in TCP, a client 110 may delay sending an ACK or a request such as an HTTP GET across the connection using the speculative DNS resolution until a response is received from the DNS resolver 230 confirming the usability of the speculative DNS resolution.

In certain aspects, the client 110 may abandon connection to the hostname 240 using the speculative DNS resolution when the speculative DNS resolution is not verified by the authoritative DNS resolution. The client 110 may also initiate a connection to the hostname 240 using the authoritative DNS resolution.

For example, the client 110 may initiate a connection to the hostname "example.com" using the speculative DNS resolution of "1.2.3.4." Concurrently, the client 110 may request an authoritative DNS resolution of "example.com" from the DNS resolver 230. If the authoritative DNS resolution from the DNS resolver 230 returns "1.2.3.4," then the client 110 may send the resource request to "example.com." If the authoritative DNS resolution from the DNS resolver 230 returns anything not including "1.2.3.4," for example, "6.7.8.9," then the client 110 may abandon the connection to "example.com" using the speculative DNS resolution "1.2.3.4," which has now proven unverified by the DNS resolver 230, and initiate a connection using the authoritative DNS resolution "6.7.8.9."

In another example, if the speculative DNS resolution is not verified by the authoritative DNS resolution, the client 110 may decline to transmit any additional data on the speculated connection, or may send a connection termination notice such as a TCP FIN.

In certain aspects, the client 110 may cryptographically verify the speculative DNS resolution of the hostname 240 and send the request for the web resource to the hostname 240 using the verified speculative DNS resolution. For example, in Quick User Datagram Protocol Internet Connection (QUIC), when an SHLO response can be authenticated as being associated with the hostname 240 for which the speculative DNS resolution was used, then the client 110 may send the request for the web resource to the hostname 240. In some embodiments, an encrypted request may be sent before the SHLO response is received.

In another example, in the case of TCP, such as when an HTTPS is sent over TLS, prior to receiving a resolution from the DNS resolver 230, a connection may be used to continue to negotiate a TLS connection and a request may be transmitted across the connection. In this example, with technology such as TLS Snap Start, an encrypted request may be sent before the cryptographic negotiations are complete. Similarly, when TCP Fast Open is used, the connection may be used to perform cryptographic negotiations for a TLS connection before receipt of the SYN-ACK, as well as prior to receipt of the DNS resolution.

Figure 3A:
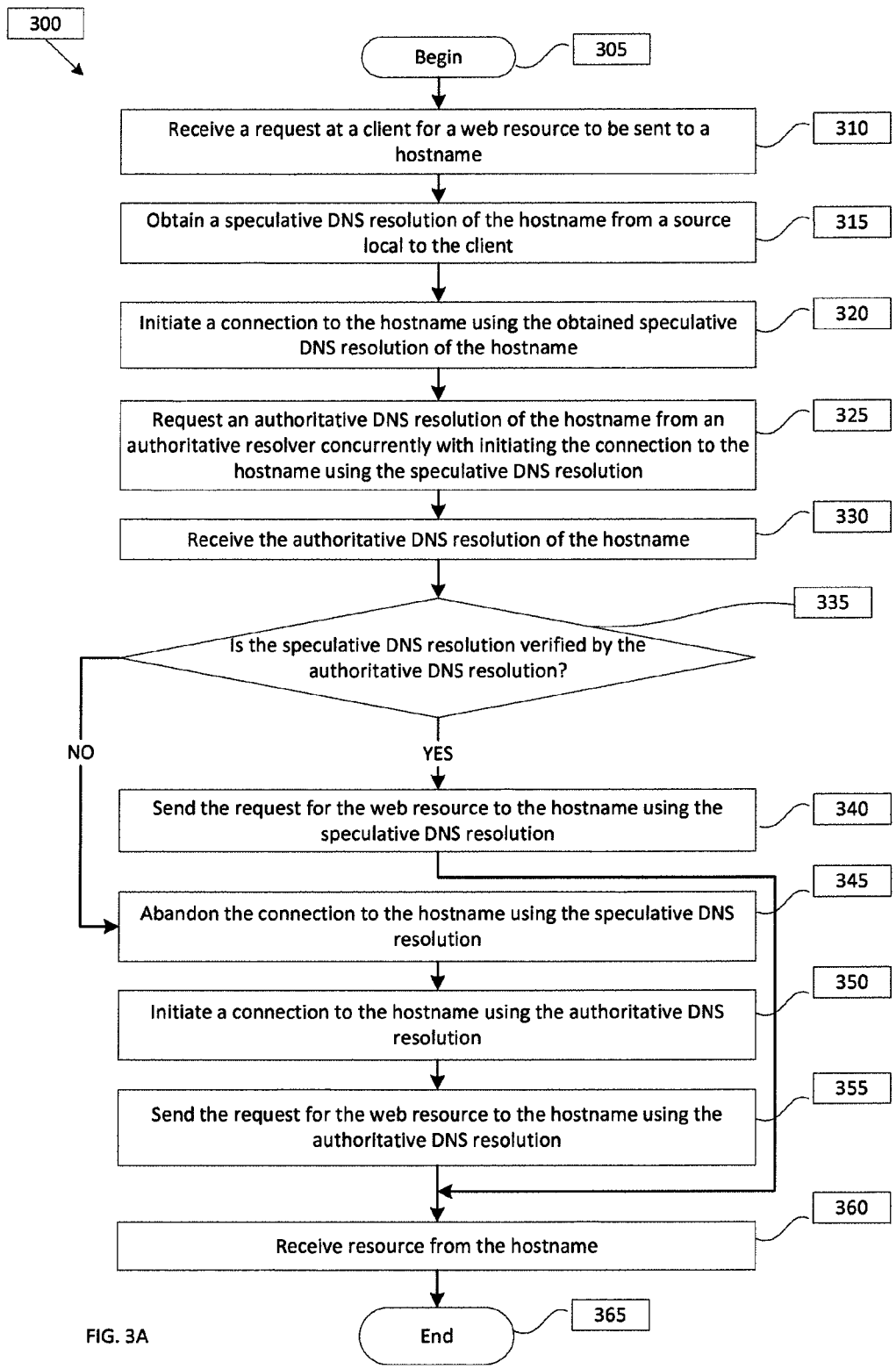
FIG. 3A illustrates an example process for speculative DNS resolution using the example client of FIG. 2.

FIG. 3A illustrates an example process 300 for speculative DNS resolution using the example client 110 of FIG. 2. While FIG. 3A is described with reference to FIG. 2, it should be noted that the process blocks of FIG. 3A may be performed by other systems.

The process 300 begins by proceeding from beginning block 305 to block 310 in which the client 110 receives a request for a web resource to be sent to a hostname 240. The process 300 then proceeds to block 315 in which the client 110 obtains a speculative DNS resolution of the hostname 240 from a source local to the client. The process 300 then proceeds to block 320 in which the client 110 initiates a connection to the hostname 240 using the obtained speculative DNS resolution of the hostname 240.

The process 300 then proceeds to block 325 in which the client 110 requests an authoritative DNS resolution of the hostname 240 from an authoritative resolver (e.g., the DNS resolver 230) concurrently with initiating the connection to the hostname 240 using the speculative DNS resolution. The process 300 then proceeds to block 330 in which the client 110 receives the authoritative DNS resolution of the hostname 240. The process 300 then proceeds to decision block 335 in which it is determined if the speculative DNS resolution is verified by the authoritative DNS resolution.

If the speculative DNS resolution is verified by the authoritative DNS resolution, then the process 300 proceeds to block 340. In block 340, the client 110 sends the request for the web resource to the hostname 240 using the speculative DNS resolution. Then, the process 300 proceeds to block 360, in which the client 110 receives the resource from the hostname 240. The process 300 then ends in block 340.

If the speculative DNS resolution is not verified by the authoritative DNS resolution, then the process 300 proceeds to block 345. In block 345, the client 110 abandons the connection to the hostname 240 using the speculative DNS resolution. The process 300 then proceeds to block 350, in which the client 110 initiates a connection to the hostname 240 using the authoritative DNS resolution. The process 300 then proceeds to block 355, in which the client 110 sends the request for the web resource to the hostname 240 using the authoritative DNS resolution. Then, the process 300 proceeds to block 360, in which the client 110 receives the resource from the hostname 240. The process 300 then ends in block 365.

FIG. 3A sets forth an example process 300 for speculative DNS resolution using the example client 110 of FIG. 2. An example will now be described using the example process 300 of FIG. 3A, an application 224 that is a web browser, a client 110 that is a smartphone, a hostname 240 that is "example.com," and a web resource request for a video.

The process 300 begins by proceeding from beginning block 305 to block 310 in which the smartphone 110 receives a request for a video from the web browser 224. The smartphone 110 is instructed to send the request to "example.com" 240. The process 300 then proceeds to block 315 in which the smartphone 110 obtains a speculative DNS resolution "1.2.3.4" of "example.com" 240 from a source local to the smartphone 110.

The process 300 then proceeds to block 320 in which the smartphone 110 initiates a connection to "example.com" 240 using the obtained speculative DNS resolution "1.2.3.4" of "example.com" 240. The process 300 then proceeds to block 325 in which the smartphone 110 requests an authoritative DNS resolution of "example.com" 240 from the DNS resolver 230 concurrently with initiating the connection to "example.com" 240 using the speculative DNS resolution "1.2.3.4."

The process 300 then proceeds to block 330 in which the smartphone 110 receives the authoritative DNS resolution of "example.com" 240. The authoritative DNS resolution of "example.com" 240 is "6.7.8.9." The process then proceeds to decision block 335 in which the smartphone 110 determines if the speculative DNS resolution "1.2.3.4" is verified by the authoritative DNS resolution "6.7.8.9." The speculative DNS resolution is not verified by the authoritative DNS resolution, so the process 300 proceeds to block 345. In block 345, the smartphone 110 abandons the connection to "example.com" 240 using "1.2.3.4." The process 300 then proceeds to block 350, in which the smartphone 110 initiates a connection to the "example.com" using the authoritative DNS resolution "6.7.8.9." The process 300 then proceeds to block 355, in which the smartphone 110 sends the request for the video to "example.com" using "6.7.8.9." The process 300 then proceeds to block 360, in which the smartphone 110 receives the video from "example.com." The process 300 then ends in block 365.

Figure 3B:
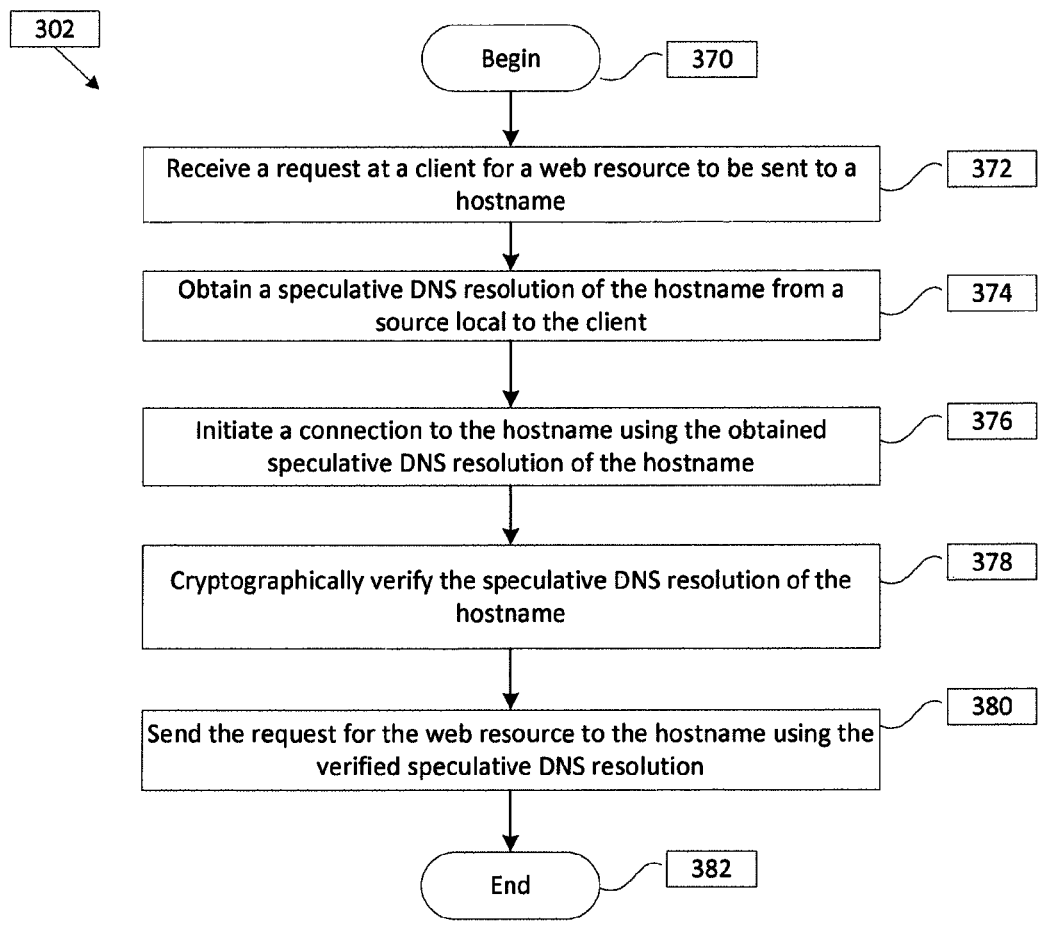
FIG. 3B illustrates an example process for speculative DNS resolution using the example client of FIG. 2.

FIG. 3B illustrates an example process 302 for speculative DNS resolution using the example client 110 of FIG. 2. While FIG. 3B is described with reference to FIG. 2, it should be noted that the process blocks of FIG. 3B may be performed by other systems.

The process 302 begins by proceeding from beginning block 370 to block 372 in which the client 110 receives a request for a web resource to be sent to a hostname 240. The process 302 then proceeds to block 374 in which the client 110 obtains a speculative DNS resolution of the hostname 240 from a source local to the client. The process 302 then proceeds to block 376 in which the client 110 initiates a connection to the hostname 240 using the obtained speculative DNS resolution of the hostname 240.

The process 302 then proceeds to block 378 in which the client 110 cryptographically verifies the speculative DNS resolution of the hostname 240. The process 302 then proceeds to block 380 in which the client 110 sends the request for the web resource to the hostname 240 using the verified speculative DNS resolution. The process 302 then ends in block 382.

Figure 4:
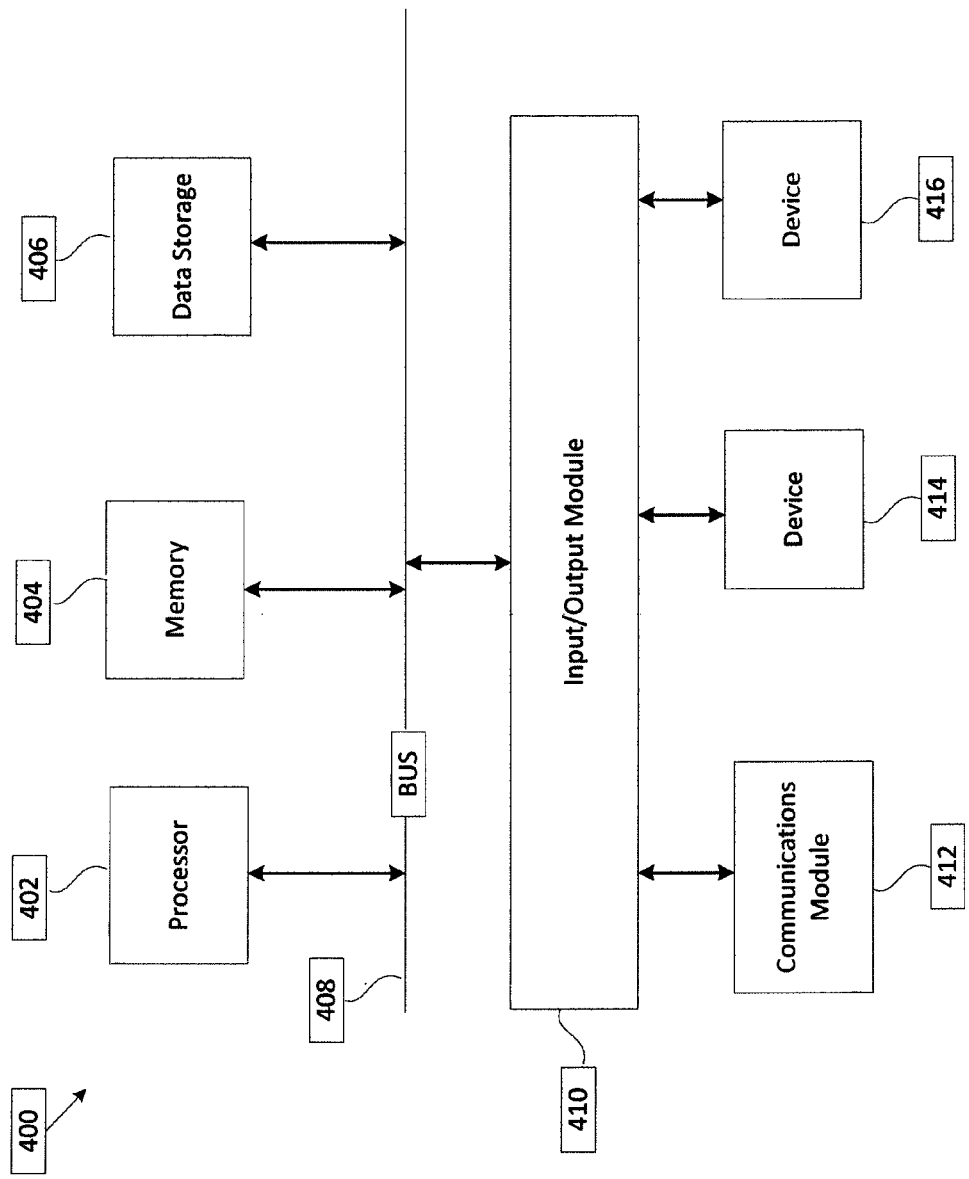
FIG. 4 is a block diagram illustrating an example computer system with which some implementations of the subject technology can be implemented.

FIG. 4 is a block diagram illustrating an example computer system 400 with which some implementations of the subject technology can be implemented. In certain aspects, the computer system 400 may be implemented using hardware or a combination of software and hardware, either in a dedicated server, or integrated into another entity, or distributed across multiple entities.

Computer system 400 (e.g., clients 110 and servers 130) includes a bus 408 or other communication mechanism for communicating information, and a processor 402 (e.g., processor 212) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 214) include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
    receiving a request at a client for a web resource to be sent to a hostname;
    obtaining, in response to receiving the request for the web resource, a speculative Domain Name System (DNS) resolution of the hostname from a source local to the client;
    initiating a connection to the hostname using the speculative DNS resolution of the hostname;
    cryptographically verifying the speculative DNS resolution with an authoritative DNS resolution of the hostname, wherein the verifying comprises:
        requesting the authoritative DNS resolution of the hostname from an authoritative resolver concurrently with initiating the connection to the hostname using the speculative DNS resolution;
        receiving the authoritative DNS resolution of the hostname; and
        comparing the speculative DNS resolution to the authoritative DNS resolution;
    when the speculative DNS resolution is verified, sending the request to the hostname over the connection initiated using the speculative DNS resolution; and
    when the speculative DNS resolution is not verified:
        abandoning the connection initiated using the speculative DNS resolution;
        initiating a connection to the hostname using the authoritative DNS resolution; and
        sending the request to the hostname over the connection initiated using the authoritative DNS resolution.

2. The method of claim 1, wherein the source comprises a web document received and stored by the client, and
    wherein obtaining the speculative DNS resolution comprises parsing the web document to identify the speculative DNS resolution of the hostname.

3. The method of claim 2, wherein the speculative DNS resolution in the web document comprises an additional attribute on an HTML link.

4. The method of claim 1, wherein the source comprises a local speculative DNS resolution cache, and wherein obtaining the speculative DNS resolution comprises looking up the speculative DNS resolution in the local speculative DNS resolution cache based on the hostname.

5. A system comprising:
a memory storing executable instructions; and
a processor configured to execute the executable instructions stored in the memory to:
receive a request at a client for a web resource to be sent to a hostname;
obtain, in response to receiving the request for the web resource, a speculative Domain Name System (DNS) resolution of the hostname from a source local to the client;
initiate a connection to the hostname using the speculative DNS resolution of the hostname;
cryptographically verify the speculative DNS resolution with an authoritative DNS resolution of the hostname, wherein the executable instructions for the verifying causes the processor to:
request the authoritative DNS resolution of the hostname from an authoritative resolver concurrently with initiating the connection to the hostname using the speculative DNS resolution;
receive the authoritative DNS resolution of the hostname; and
compare the speculative DNS resolution to the authoritative DNS resolution;
when the speculative DNS resolution is verified, send the request to the hostname over the connection initiated using the speculative DNS resolution; and
when the speculative DNS resolution is not verified:
abandon the connection initiated using the speculative DNS resolution;
initiate a connection to the hostname using the authoritative DNS resolution; and
send the request to the hostname over the connection initiated using the authoritative DNS resolution,
wherein the source comprises a local speculative DNS resolution cache.

6. The system of claim 5, wherein obtaining the speculative DNS resolution comprises looking up the speculative DNS resolution in the local speculative DNS resolution cache based on the hostname.

7. A non-transitory machine-readable medium embodying instructions that, when executed by a machine, allow the machine to perform a method comprising:

receiving a command to connect a client to a hostname;
obtaining, in response to receiving the command to connect to the hostname, a speculative Domain Name System (DNS) resolution of the hostname from a local source;
initiating a connection to the hostname using the speculative DNS resolution of the hostname, the connection to the hostname being initiated prior to verification of the speculative DNS resolution;
requesting an authoritative DNS resolution of the hostname from an authoritative resolver during the initiating of the connection to the hostname using the speculative DNS resolution;
receiving the authoritative DNS resolution of the hostname;
cryptographically verifying the speculative DNS resolution with the authoritative DNS resolution, wherein the verifying comprises:
requesting the authoritative DNS resolution of the hostname from an authoritative resolver concurrently with initiating the connection to the hostname using the speculative DNS resolution;
receiving the authoritative DNS resolution of the hostname; and
comparing the speculative DNS resolution to the authoritative DNS resolution;
when the speculative DNS resolution is verified, sending the request to the hostname over the connection initiated using the speculative DNS resolution; and
when the speculative DNS resolution is not verified:
abandoning the connection initiated using the speculative DNS resolution;
initiating a connection to the hostname using the authoritative DNS resolution; and
sending the request to the hostname over the connection initiated using the authoritative DNS resolution.

8. The non-transitory machine-readable medium of claim 7, wherein the local source comprises a web document received and stored by the client, and
wherein obtaining the speculative DNS resolution comprises parsing the web document to identify the speculative DNS resolution of the hostname.

9. The non-transitory machine-readable medium of claim 7, wherein the local source comprises a local speculative DNS resolution cache, and
wherein obtaining the speculative DNS resolution comprises looking up the speculative DNS resolution in the local speculative DNS resolution cache based on the hostname.

* * * * *